United States Patent
Warren et al.

(10) Patent No.: US 10,808,570 B2
(45) Date of Patent: Oct. 20, 2020

(54) LOW PROFILE EMBEDDED BLADE TIP CLEARANCE SENSOR

(71) Applicant: United Technologies Corporation, Farmington, CT (US)

(72) Inventors: Eli Cole Warren, Wethersfield, CT (US); Kevin A. Ford, Middletown, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 61 days.

(21) Appl. No.: 15/702,190

(22) Filed: Sep. 12, 2017

(65) Prior Publication Data
US 2019/0078869 A1    Mar. 14, 2019

(51) Int. Cl.
*F01D 21/00*    (2006.01)
*F04D 29/52*    (2006.01)
(Continued)

(52) U.S. Cl.
CPC .......... *F01D 21/003* (2013.01); *F01D 17/02* (2013.01); *F04D 27/001* (2013.01);
(Continued)

(58) Field of Classification Search
CPC ........ F01D 21/003; F01D 11/20; F01D 17/02; G01B 7/14; G01B 11/14; G01B 1/00
USPC ............. 324/200, 207.15–207.23, 232–234, 324/242–246, 378, 388–390, 500, 529, 324/530, 177, 600, 662; 415/4.2, 4.4, 415/907, 118, 119, 26, 129
See application file for complete search history.

(56) References Cited

U.S. PATENT DOCUMENTS

| 4,804,905 A | 2/1989 | Ding et al. |
| 5,166,626 A | 11/1992 | Hester et al. |

(Continued)

FOREIGN PATENT DOCUMENTS

| DE | 3433351 | * 1/1986 | ............ F01D 21/04 |
| DE | 3433351 C1 | 1/1986 | |
| EP | 3018445 A1 | 5/2016 | |

OTHER PUBLICATIONS

The Extended European Search Report for Application No. 18183232.0-1006; Report dated Jan. 18, 2019; Report Received Date: Feb. 13, 2019; 10 pages.

(Continued)

*Primary Examiner* — Vincent Q Nguyen
*Assistant Examiner* — Trung Nguyen
(74) *Attorney, Agent, or Firm* — Cantor Colburn LLP

(57) ABSTRACT

In combination a blade clearance sensor and a radial flow separation wall of a gas turbine engine is provided. The blade clearance sensor is embedded in the radial flow separation wall. The radial flow separation wall comprising: a splitter hoop located radially outward from blades in a first flow path of the gas turbine engine, the splitter hoop being about concentric to a blade path of the blades; and one or more guide vane bases attached to a guide vane located radially outward from the splitter hoop in a second flow path, each of the one or more guide vane bases being securely attached to a radially outward surface of the splitter hoop, wherein the blade clearance sensor is configured to detect a blade clearance between the blades and the splitter hoop.

19 Claims, 4 Drawing Sheets

(51) Int. Cl.
*G01B 1/00* (2006.01)
*F04D 27/00* (2006.01)
*F01D 17/02* (2006.01)
*G01B 7/14* (2006.01)

(52) U.S. Cl.
CPC ............ *F04D 29/526* (2013.01); *G01B 1/00* (2013.01); *G01B 7/14* (2013.01); *F05D 2260/83* (2013.01)

(56) References Cited

U.S. PATENT DOCUMENTS

| | | |
|---|---|---|
| 8,344,741 B2 | 1/2013 | Sheikman et al. |
| 9,518,850 B2 | 12/2016 | Warren |
| 9,709,376 B2 | 7/2017 | Zhe et al. |
| 2006/0002789 A1* | 1/2006 | Haffner ................ G01B 11/14 415/118 |
| 2010/0247283 A1* | 9/2010 | Andrew ................ F01D 11/14 415/1 |
| 2013/0309063 A1 | 11/2013 | Buyle et al. |
| 2016/0215633 A1* | 7/2016 | Drake .................... F01D 9/065 |
| 2018/0030987 A1* | 2/2018 | Clarke .................. F04D 29/526 |

OTHER PUBLICATIONS

EP Office Action for Application No. 18 183 232.0-1004; Ref. 23.139167; dated Mar. 25, 2020; 6 pages.

\* cited by examiner

LOW PROFILE EMBEDDED BLADE TIP CLEARANCE SENSOR

STATEMENT OF FEDERAL SUPPORT

This invention was made with Government support under FA8650-09-D-2923-0021 awarded by the United States Department of the Air Force. The Government has certain rights in the invention.

BACKGROUND

The subject matter disclosed herein generally relates to measurement devices and, more particularly, to a method and an apparatus for detecting blade tip clearance for a gas turbine engine.

Gas turbine engines typically include a compressor, a combustor, and a turbine, with an annular flow path extending axially through each. Initially, air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate.

The compressor and turbine sections include multiple rotors and stators configured to enable optimal operation. Gas turbine engines maintain an optimal clearance (distance) between the tips of the rotors and an outside diameter of a gas path within the turbine engine, and thereby provide the conditions necessary to achieve a desired performance.

SUMMARY

According to one embodiment, in combination a blade clearance sensor and a radial flow separation wall of a gas turbine engine is provided. The blade clearance sensor is embedded in the radial flow separation wall. The radial flow separation wall comprising: a splitter hoop located radially outward from blades in a first flow path of the gas turbine engine, the splitter hoop being about concentric to a blade path of the blades; and one or more guide vane bases attached to a guide vane located radially outward from the splitter hoop in a second flow path, each of the one or more guide vane bases being securely attached to a radially outward surface of the splitter hoop, wherein the blade clearance sensor is configured to detect a blade clearance between the blades and the splitter hoop.

In addition to one or more of the features described above, or as an alternative, further embodiments may include that the blade clearance sensor further comprises a housing; and a sensing element at least partially enclosed in the housing.

In addition to one or more of the features described above, or as an alternative, further embodiments may include that the blade clearance sensor is securely connected to the splitter hoop by one or more welds.

In addition to one or more of the features described above, or as an alternative, further embodiments may include that the blade clearance sensor further comprises a first section and a second section oriented radially outward from the first section when the blade clearance sensor is installed in the gas turbine engine, wherein the first section is at least partially enclosed in a splitter hoop orifice located in the splitter hoop.

In addition to one or more of the features described above, or as an alternative, further embodiments may include that the second section is at least partially enclosed in a vane orifice located in the one or more guide vane bases.

In addition to one or more of the features described above, or as an alternative, further embodiments may include that a radially inward surface of the splitter hoop is at least partially coated with an abradable coating.

In addition to one or more of the features described above, or as an alternative, further embodiments may include that a radially inward surface of the splitter hoop is at least partially coated with an abradable coating with the exception of the splitter hoop orifice.

In addition to one or more of the features described above, or as an alternative, further embodiments may include that a radially inward surface of the first section of the blade clearance sensor is coated with a dielectric abradable coating.

In addition to one or more of the features described above, or as an alternative, further embodiments may include that the one or more guide vane bases further comprises a passageway through which a lead wire electrically connects the blade clearance sensor to a measurement device.

In addition to one or more of the features described above, or as an alternative, further embodiments may include that a potting material encapsulates the second section of the blade clearance sensor within the vane orifice.

In addition to one or more of the features described above, or as an alternative, further embodiments may include that the vane orifice stretches across two guide vane bases.

In addition to one or more of the features described above, or as an alternative, further embodiments may include that a potting material fully encapsulates the lead wire within the passageway.

According to another embodiment, a method of embedding a blade clearance sensor into a radial flow separation wall within a gas turbine engine. The radial flow separation wall comprises a splitter hoop and one or more guide vane bases. The method comprising: forming a splitter hoop orifice within the splitter hoop, wherein the splitter hoop is located radially outward from blades of the gas turbine engine when the splitter hoop is installed in the gas turbine engine; forming a vane orifice within the one or more guide vane bases; aligning the vane orifice with the splitter hoop orifice, the vane orifice being radially outward from the splitter hoop office; and inserting the blade clearance sensor into the vane orifice and the splitter hoop orifice.

In addition to one or more of the features described above, or as an alternative, further embodiments may include: securely attaching the one or more guide vane bases to a radially outward surface of the splitter hoop.

In addition to one or more of the features described above, or as an alternative, further embodiments may include: forming a passageway within the one or more guide vane bases; electrically connecting a lead wire to the blade clearance sensor; and inserting the lead wire into the passageway.

In addition to one or more of the features described above, or as an alternative, further embodiments may include: encapsulating the lead wire within the passageway.

In addition to one or more of the features described above, or as an alternative, further embodiments may include: encapsulating the blade clearance sensor within the splitter hoop orifice at a radially inward side of the splitter hoop orifice with a dielectric abradable coating.

In addition to one or more of the features described above, or as an alternative, further embodiments may include: encapsulating the blade clearance sensor within the vane orifice at a radially outward side of the vane orifice.

In addition to one or more of the features described above, or as an alternative, further embodiments may include: coating a radially inward side of the splitter hoop with an abradable coating with the exception of the splitter hoop orifice.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
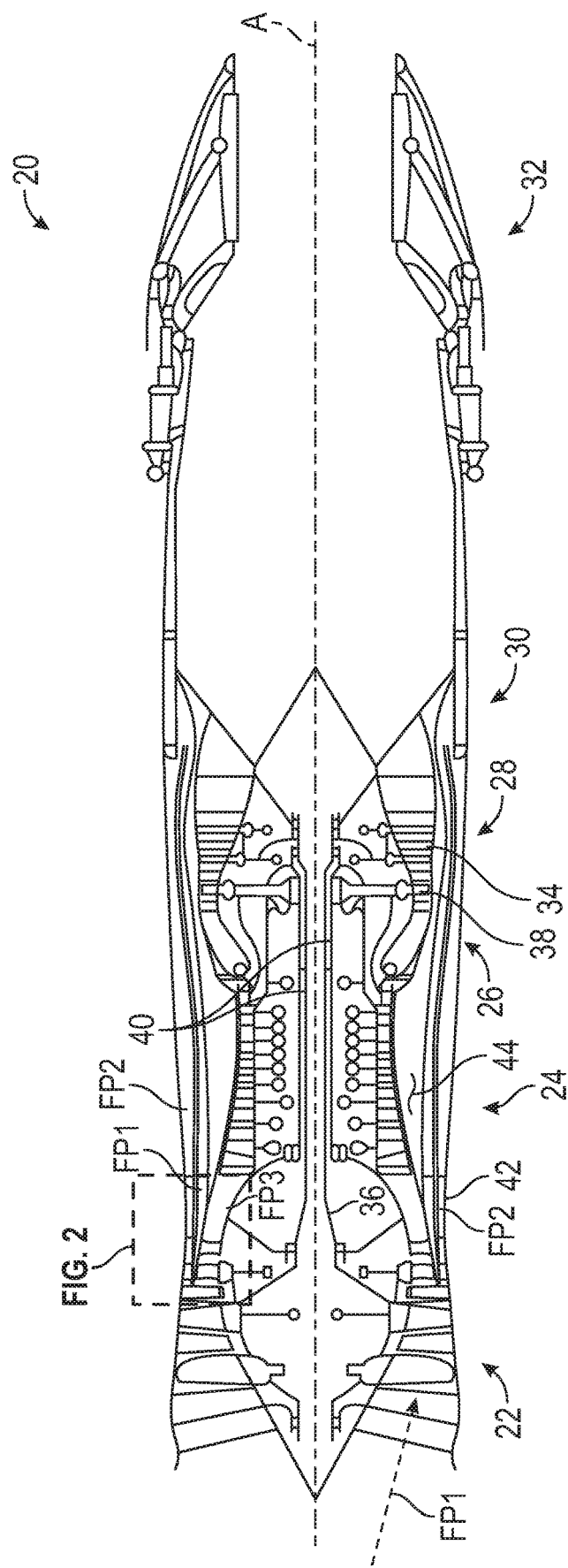
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26, a turbine section 28, an augmenter section 30 and a nozzle section 32. The sections are defined along a central longitudinal engine axis A. Although depicted as an augmented low bypass gas turbine engine in the disclosed non-limiting embodiment, it should be understood that the concepts described herein are applicable to other gas turbine engines including geared architecture engines, direct drive turbofans, turboshaft engines and others.

The compressor section 24, the combustor section 26 and the turbine section 28 are generally referred to as the engine core. The fan section 22 and a low pressure turbine 34 of the turbine section 28 are coupled by a first shaft 36 to define a low spool. The compressor section 24 and a high pressure turbine 38 of the turbine section 28 are coupled by a second shaft 40 to define a high spool.

Figure 2:
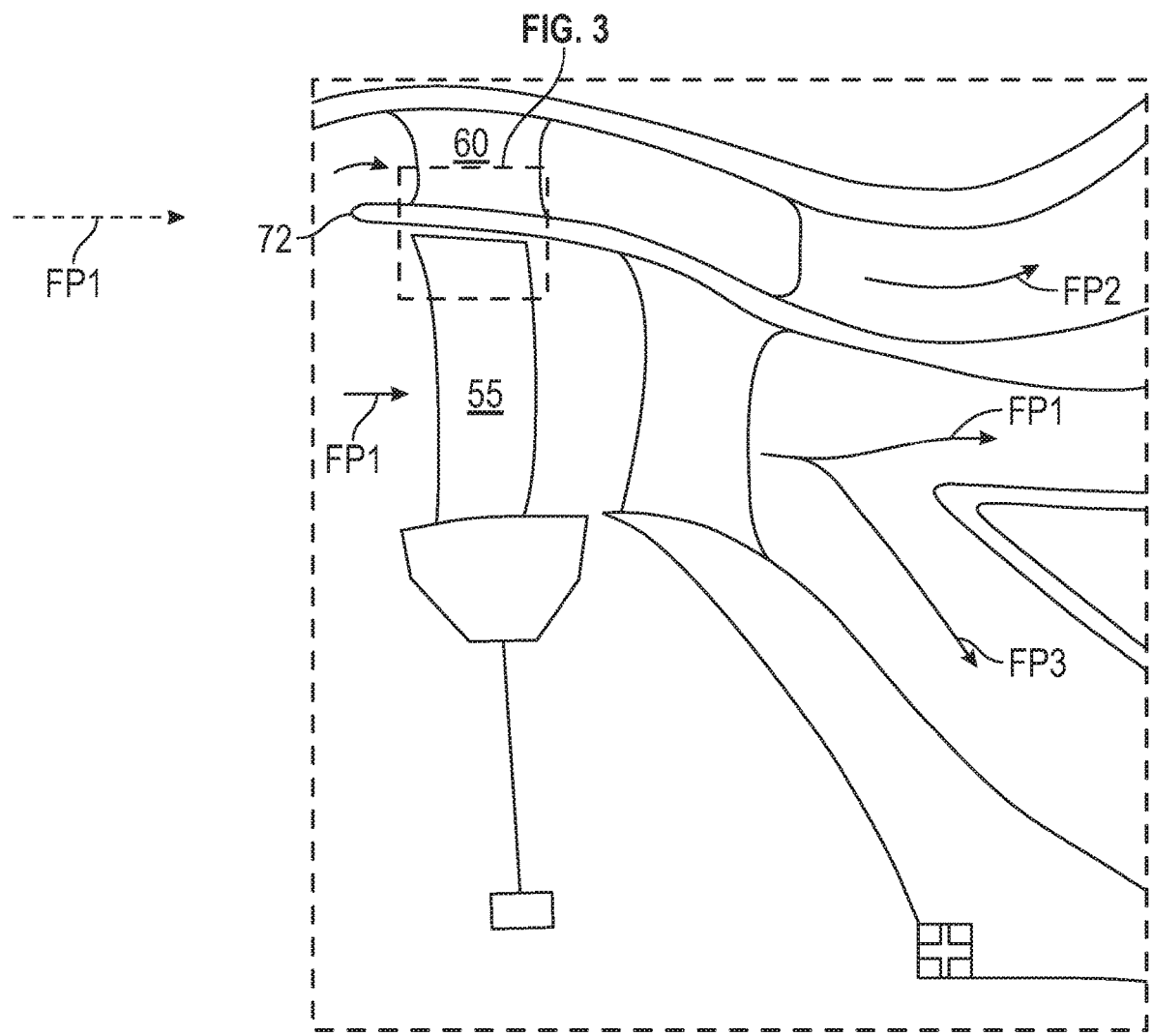
FIG. 2 is an enlarged cross sectional illustration of the gas turbine engine of FIG. 1, in accordance with an embodiment of the disclosure.

A first flow path FP1 flows air into the fan section 22 and then splits into a first flow path FP1, a second flow path FP2, and a third flow path FP3, as seen in FIG. 1 and also FIG. 2. As shown in FIGS. 1 and 2, the first flow path FP1 may first split into the second flow path FP2 and then later be split into the first flow path FP1 and the third flow path FP3. An outer engine case structure 42 and an inner engine structure 44 define a generally annular first flow path FP1 around a third flow path FP3 of the engine core. The third flow path FP3 is the core flow path. It should be understood that various structure within the engine may define the outer engine case structure 42 and the inner engine structure 44 which essentially define an exoskeleton to support the core engine therein.

Air which enters the fan section 22 is divided between a core flow through the first flow path FP1, the second flow path FP2, and the third flow path FP3. The third flow path FP3 passes through the combustor section 26, the turbine section 28, then the augmentor section 30 where fuel may be selectively injected and burned to generate additional thrust through the nozzle section 32. The secondary flow may be utilized for a multiple of purposes to include, for example, cooling and pressurization. The secondary flow as defined herein is any flow different from the primary combustion gas exhaust core flow. The secondary flow passes through an annulus defined by the outer engine case structure 42 and the inner engine structure 44 then may be at least partially injected into the core flow adjacent the nozzle section 32.

The outer engine case structure 42 and the inner engine structure 44 as well as other engine structures are often manufactured of Ceramic Matrix Composite, Organic Matrix Composite materials and combinations thereof which are moisture sensitive. The Ceramic Matrix Composite and the Organic Matrix Composite materials will hereinafter be referred to herein as composite materials but it should be understood that any such moisture sensitive materials and structured are also contemplated.

Figure 3:
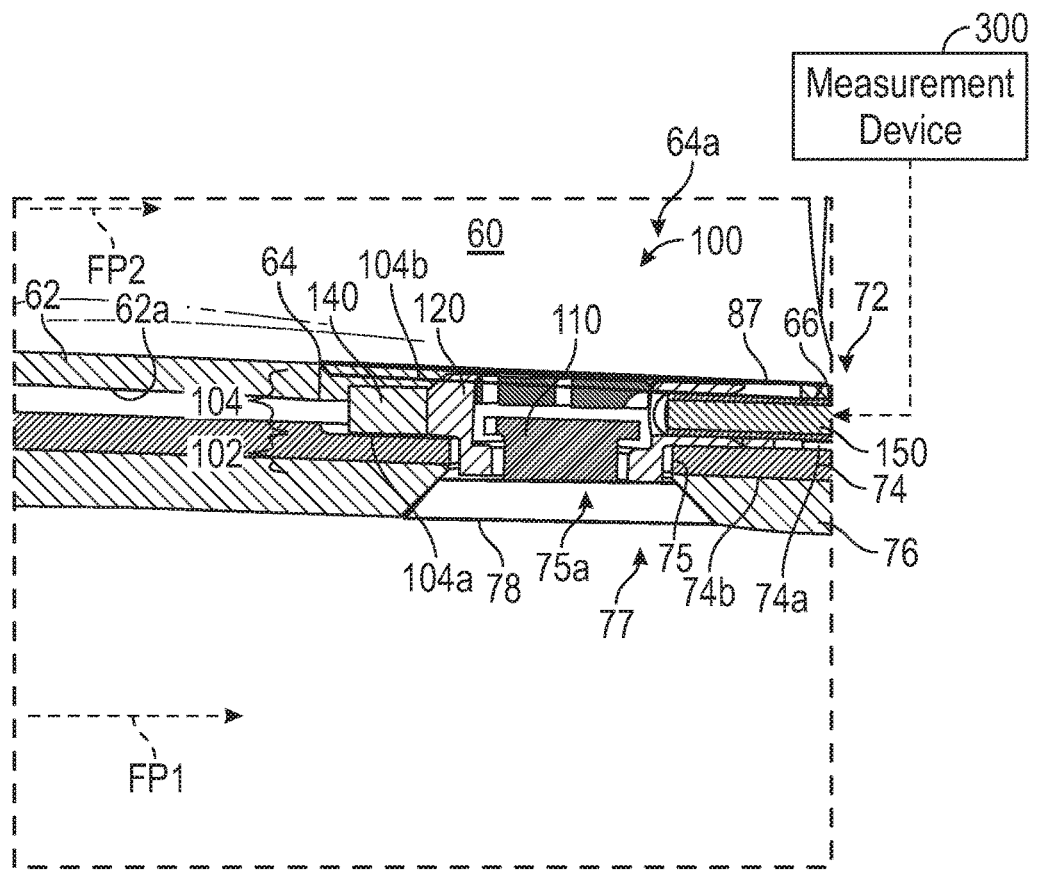
FIG. 3 is a cross-sectional illustration of a blade clearance sensor embedded in a radial flow separation wall of a gas turbine engine, in accordance with an embodiment of the disclosure.
Figure 4:
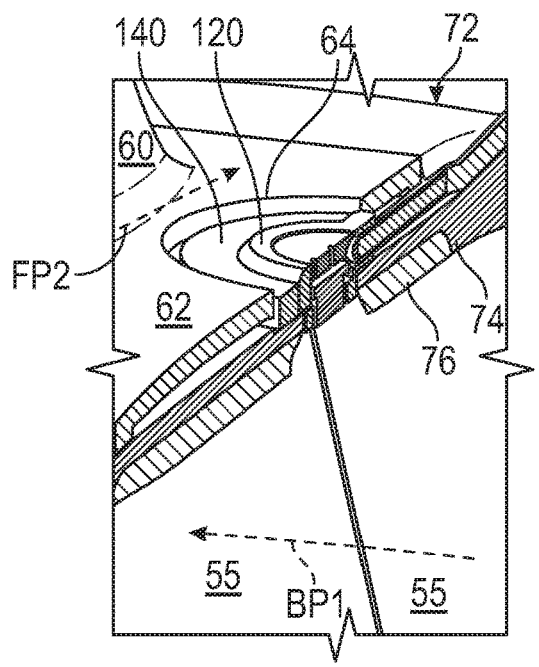
FIG. 4 is a cross-sectional illustration of a blade clearance sensor embedded in a radial flow separation wall of a gas turbine engine, in accordance with an embodiment of the disclosure.

Referring now to FIGS. 2-4 with continued reference to FIG. 1. FIGS. 2-4 show cross-sectional views of the engine 20 a blade clearance sensor 100 embedded in a radial flow separation wall 72 of a gas turbine engine 20, in accordance with an embodiment of the disclosure. The blade clearance sensor 100 may include a sensing element 110, a housing 120, and a collar 140. The blade clearance sensor 100 is configured to measure a clearance between a blade 55 and the radial flow separation wall 72 of the gas turbine engine 20. The radial flow separation wall 72 is configured to separate a first flow path FP1 of the gas turbine engine 20 from a second flow path FP2 of the gas turbine engine 20. The first flow path FP1 flows through blades 55 of the gas turbine engine 20 and the second flow path FP2 flows through guide vanes 60 of the gas turbine engine 20. The third flow path FP3 flows through the core of the engine. It is understood that embodiments disclosed herein are also applicable to gas turbine engines with more or less paths than depicted. The radial flow separation wall 72 may be composed of one or more components of the gas turbine engine 20. As seen in FIGS. 3-4, the radial flow separation wall 72 may be composed of a splitter hoop 74, one or more guide vane bases 62, and/or an abradable coating 76 coated on a radially inward surface of the splitter hoop 74. The blade clearance sensor 100 is configured to be embedded in the radial flow separation wall 72 of the gas turbine engine 20 in order to monitor the clearance between the blade 55 and the radial flow separation wall 72.

As seen in FIGS. 3 and 4, the blade clearance sensor 100 is embedded in the radial flow separation wall 72 of the gas turbine engine 20 opposite a blade 55 of the gas turbine engine 20. Advantageously, the blade clearance sensor 100 is thin enough to be fully embedded in the radial flow separation wall 72, thus not interfering with airflow through the first flow path FP1 and the second flow path FP2. The blade 55 rotates along the blade path BP1. The radial flow separation wall 72 is about concentric to a blade path BP1 of the blades 55. The blade clearance sensor 100 may be located in locations including but not limited to the compressor section 24 and/or the turbine section 28 (see FIG. 1). The blade clearance sensor 100 may be composed of a sensing element 110 at least partially encapsulated in a housing 120. The sensing element 110 may be located in the housing 120. In the illustrated embodiment, the blade clearance sensor 100 is attached to the splitter hoop 74. In an embodiment, the blade clearance sensor 100 may be attached to the splitter hoop 74 by welding the housing 120 onto a collar 140 that has been welded onto the splitter hoop 74. In an embodiment, the collar 140 may be welded onto the splitter hoop 74 using five welds.

As shown in FIG. 3, the blade clearance sensor 100 may include a first section 102 and a second section 104. The first section 102 and/or the second section 104 may be cylindrical in shape as shown in FIGS. 2 and 3. In an embodiment, the first section 102 is located radially inward from the second section 104 when the blade clearance sensor 100 is installed in the gas turbine engine 20. The second section 104 may include a first surface 104a and a second surface 104b radially outward from the first surface 104a when the blade clearance sensor 100 is installed in the gas turbine engine 20. The first surface 104a of the second section 104 may be secured to a radially outward surface 74a of the splitter hoop 74. The first section 102 of the blade clearance sensor 100 extends into a splitter hoop orifice 75 of the splitter hoop 74. The blade clearance sensor 100 may be encapsulated within the splitter hoop orifice 75 at a radially inward side 75a of the splitter hoop orifice 75 with a dielectric abradable coating 78. As seen in FIGS. 2 and 3, the first section 102 may project into a gap 77 in the abradable coating 76. The gap 77 may be filled with a dielectric abradable coating 78 such as for example Yttrium Oxide. Advantageously, the dielectric abradable coating 78 provides an aerodynamically smooth surface for airflow through the first flow path FP1 while encapsulating the blade clearance sensor 100. The dielectric abradable coating may have to be machined and/or sanded smooth after it is applied to provide the aerodynamically smooth surface. Also advantageously, the dielectric abradable coating 78 minimizes electronic interference with blade clearance sensor 100.

As shown by FIG. 3, the second section 104 may be at least partially encapsulated by a vane orifice 64 located in the guide vane base 62. The vane orifice 64 may stretch across one or two guide vanes 60. The blade clearance sensor 100 may be encapsulated within the vane orifice 64 at a radially outward side 64a of the vane orifice 64 by a potting material 87 or similar material. The vane orifice 64 may be filled with a potting material 87 to encapsulate the second section 104. Advantageously, the potting material 87 provides an aerodynamically smooth surface for airflow through the second flow path FP2 while encapsulating the blade clearance sensor 100. The potting material 87 may have to be machined and/or sanded smooth after it is applied to provide the aerodynamically smooth surface. The guide vane base 62 also includes a passageway 66 through which a lead wire 150 may electrically connect the blade clearance sensor 100 to a measurement device 300. The measurement device 300 is configured to determine a blade clearance using the sensing element 110 of the blade clearance sensor 100. In an embodiment, the sensing element 110 may be a capacitance sensor. The measurement device 300 may include a processor and a memory. For ease of illustration, the processor and memory are not shown in FIG. 3. The processor can be any type or combination of computer processors, such as a microprocessor, microcontroller, digital signal processor, application specific integrated circuit, programmable logic device, and/or field programmable gate array. The memory is an example of a non-transitory computer readable storage medium tangibly embodied in or operably connected to the path determination system including executable instructions stored therein, for instance, as firmware.

Figure 5:
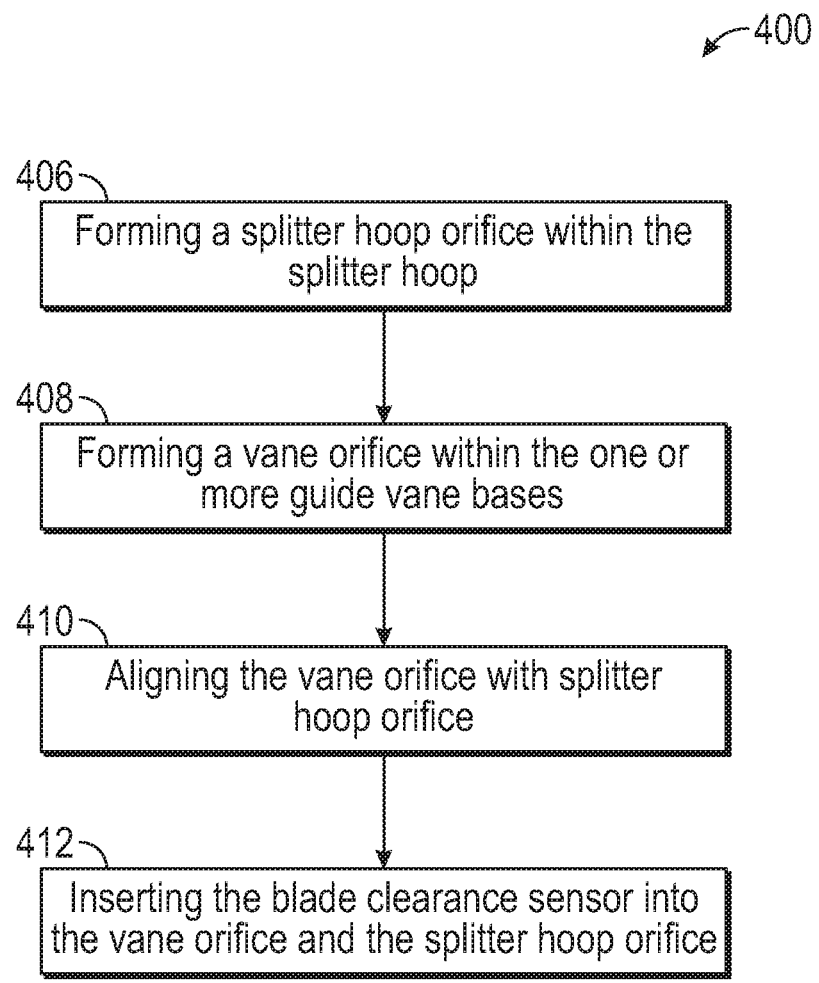
FIG. 5 is a flow chart illustrating a method of embedding a blade clearance sensor within a radial flow separation wall of a gas turbine engine, in accordance with an embodiment of the disclosure.

Referring now to FIG. 5 with continued reference to FIGS. 1-4. FIG. 5 is a flow chart illustrating a method 400 embedding a blade clearance sensor 100 into a radial flow separation wall 72 within a gas turbine engine 20, in accordance with an embodiment. At block 406, a splitter hoop orifice 75 is formed within the splitter hoop 74. The splitter hoop orifice 75 may be formed by machining, drilling, additive manufacturing, subtractive manufacturing, casting, or any other similar manufacturing process known to one of skill in the art. As mentioned above, the splitter hoop 74 is located radially outward from blades 55 of the gas turbine engine 20 when the splitter hoop 74 is installed in the gas turbine engine 20. At block 408, a vane orifice 64 is formed within the one or more guide vane bases 62. The vane orifice 64 may be formed by machining, drilling, additive manufacturing, subtractive manufacturing, casting, or any other similar manufacturing process known to one of skill in the art. At block 410, the vane orifice 64 is aligned with the splitter hoop orifice 75. The vane orifice 64 is located radially outward from the splitter hoop office 75. The one or more guide vane bases 62 may be securely attached to a radially outward surface 74a of the splitter hoop 74. At block 412, the blade clearance sensor 100 is inserted into the vane orifice 64 and the splitter hoop orifice 75. The blade clearance sensor 100 may be encapsulated within the splitter hoop orifice 75 at a radially inward side 75a of the splitter hoop orifice 75 with a dielectric abradable coating 78. The blade clearance sensor 100 may be encapsulated within the vane orifice 64 at a radially outward side 64a of the vane orifice 64. The method 400 may further comprise: forming a passageway 66 within the one or more guide vane bases 62; electrically connecting a lead wire 150 to the blade clearance sensor 100; and inserting the lead wire 150 into the passageway 66. The lead wire 150 may be encapsulated in the passageway 66, as described above.

While the above description has described the flow process of FIG. 5 in a particular order, it should be appreciated that unless otherwise specifically required in the attached claims that the ordering of the steps may be varied.

Technical effects of embodiments of the present disclosure include embedding a blade clearance sensor within a radial flow separation wall separating two flow paths in a gas turbine engine.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A device comprising, in combination, a blade clearance sensor and a radial flow separation wall of a gas turbine engine, wherein the blade clearance sensor is embedded in the radial flow separation wall, the radial flow separation wall comprising:
   a splitter hoop located radially outward from blades in a first flow path within the gas turbine engine, the splitter hoop being about concentric to a blade path of the blades; and
   one or more guide vane bases attached to a guide vane located radially outward from the splitter hoop in a second flow path within the gas turbine engine, each of the one or more guide vane bases being securely attached to a radially outward surface of the splitter hoop, wherein at least one of the one or more guide vane bases includes a vane orifice, and
   wherein the blade clearance sensor is configured to detect a blade clearance between the blades and the splitter hoop.

2. The device of claim 1, wherein the blade clearance sensor further comprises a housing; and a sensing element at least partially enclosed in the housing.

3. The device of claim 1, wherein the blade clearance sensor is securely connected to the splitter hoop by one or more welds.

4. The device of claim 2, wherein the blade clearance sensor further comprises a first section and a second section oriented radially outward from the first section when the blade clearance sensor is installed in the gas turbine engine, wherein the first section is at least partially enclosed in a splitter hoop orifice located in the splitter hoop.

5. The device of claim 4, wherein the second section is at least partially enclosed in the vane orifice located in the one or more guide vane bases.

6. The device of claim 1, wherein a radially inward surface of the splitter hoop is at least partially coated with an abradable coating.

7. The device of claim 4, wherein a radially inward surface of the splitter hoop is at least partially coated with an abradable coating with the exception of the splitter hoop orifice.

8. The device of claim 7, wherein a radially inward surface of the first section of the blade clearance sensor is coated with a dielectric abradable coating.

9. The device of claim 1, wherein the one or more guide vane bases further comprises a passageway through which a lead wire electrically connects the blade clearance sensor to a measurement device.

10. The device of claim 5, wherein a potting material encapsulates the second section of the blade clearance sensor within the vane orifice.

11. The device of claim 5, wherein the vane orifice stretches across two guide vane bases.

12. The device of claim 9, wherein a potting material fully encapsulates the lead wire within the passageway.

13. A method of embedding a blade clearance sensor into a radial flow separation wall within a gas turbine engine, wherein the radial flow separation wall comprises a splitter hoop and one or more guide vane bases, the method comprising:
   forming a splitter hoop orifice within the splitter hoop, wherein the splitter hoop is located radially outward from blades in a first flow path within the gas turbine engine when the splitter hoop is installed in the gas turbine engine;
   forming a vane orifice within the one or more guide vane bases;
   aligning the vane orifice with the splitter hoop orifice, the vane orifice being radially outward from the splitter hoop office in a second flow path within the gas turbine engine; and
   inserting the blade clearance sensor into the vane orifice and the splitter hoop orifice.

14. The method of claim 13, further comprising:
securely attaching the one or more guide vane bases to a radially outward surface of the splitter hoop.

15. The method of claim 13, further comprising:
forming a passageway within the one or more guide vane bases;
electrically connecting a lead wire to the blade clearance sensor; and
inserting the lead wire into the passageway.

16. The method of claim 15, further comprising:
encapsulating the lead wire within the passageway.

17. The method of claim 13, further comprising:
encapsulating the blade clearance sensor within the splitter hoop orifice at a radially inward side of the splitter hoop orifice with a dielectric abradable coating.

18. The method of claim 13, further comprising:
encapsulating the blade clearance sensor within the vane orifice at a radially outward side of the vane orifice.

19. The method of claim 13, further comprising:
coating a radially inward side of the splitter hoop with an abradable coating with the exception of the splitter hoop orifice.

* * * * *